US012603778B2

(12) United States Patent
Richter

(10) Patent No.: US 12,603,778 B2
(45) Date of Patent: Apr. 14, 2026

(54) APPARATUS AND METHOD FOR GENERATING AN NFT VAULT

(71) Applicant: Linda Lee Richter, Oakland, CA (US)

(72) Inventor: Linda Lee Richter, Oakland, CA (US)

( * ) Notice: Subject to any disclaimer, the term of this patent is extended or adjusted under 35 U.S.C. 154(b) by 0 days.

(21) Appl. No.: 18/112,363

(22) Filed: Feb. 21, 2023

(65) Prior Publication Data

US 2024/0283648 A1 Aug. 22, 2024

(51) Int. Cl.
*H04L 29/06* (2006.01)
*H04L 9/08* (2006.01)
*H04L 9/32* (2006.01)

(52) U.S. Cl.
CPC .......... *H04L 9/3213* (2013.01); *H04L 9/0861* (2013.01)

(58) Field of Classification Search
CPC ...... G06F 21/10; H04L 9/3213; H04L 9/0861
See application file for complete search history.

(56) References Cited

U.S. PATENT DOCUMENTS 8,909,924 B2 12/2014 Lord
11,616,650 B1 * 3/2023 Panjwani .............. H04L 9/3213
713/168

2006/0215558 A1 * 9/2006 Chow ..................... H04L 47/10
370/252
2015/0106883 A1 4/2015 Miller
2017/0018112 A1 * 1/2017 Vaganov ................... B44F 7/00
2017/0199855 A1 * 7/2017 Fishbeck .............. G06Q 10/109
2021/0248214 A1 * 8/2021 Goldston ............. G06F 16/686
2021/0281410 A1 * 9/2021 Hain .................... G06Q 20/065
2022/0255733 A1 8/2022 Hakim
2022/0309542 A1 * 9/2022 Blaikie, III ........ G06Q 30/0261
2023/0011621 A1 * 1/2023 Jakobsson ............. H04L 9/3213
2023/0073859 A1 * 3/2023 Matthews .......... G06Q 30/0185

OTHER PUBLICATIONS

"NFTX, vault creation, 2022, Gitbook, v2.6.9" (Year: 2022).*

* cited by examiner

*Primary Examiner* — Dao Q Ho
(74) *Attorney, Agent, or Firm* — CALDWELL LLC

(57) ABSTRACT

The present disclosure is directed to an apparatus and method for generating an NFT vault. The apparatus may include and a processor and a memory storing instructions to be carried out by the processor. In some embodiments, the processor may be configured to receive a user input via a user interface, where the user input may include token data. The processor may be configured to generate a data structure, where the data structure associates the user with the token data and encode an access permission in the data structure, where the access permission enables a third-party viewer access to the data structure. The processor may be configured to generate a virtual space as a function of the data structure. Further, the processor may be configured to display the virtual space via the user interface.

20 Claims, 8 Drawing Sheets

200

208

204

Transaction A1
•
•
•
Transaction AN

Hash A
Transaction B1
•
•
•
Transaction BN

208

204

Hash B
Transaction C1
•
•
•
Transaction CN

208

204

700

705 Receiving A User Input

710 Generating A Data Structure

715 Encoding An Access Permission In The Data Structure

720 Generating A Virtual Space As A Function Of The Data Structure

725 Displaying The Virtual Space

APPARATUS AND METHOD FOR GENERATING AN NFT VAULT

FIELD OF THE INVENTION

The present invention generally relates to the field of NFTs. In particular, the present invention is directed to an apparatus and method for generating an NFT vault.

BACKGROUND

Methods for displaying and arranging NFTs through user interface are insufficient. There is a need for efficient optimize of digital curation of an NFT vault through a user interface.

SUMMARY OF THE DISCLOSURE

In an aspect an apparatus for generating an NFT vault may include at least a processor and a memory communicatively connected to the at least processor, the memory containing instructions configuring the at least processor to receive a user input via a user interface, where the user input may include token data. The processor may be configured to generate a data structure, where the data structure associates the user with the token data and encode an access permission in the data structure, where the access permission enables a third-party viewer access to the data structure. The processor may be configured to generate a virtual space as a function of the data structure. Further, the processor may be configured to display the virtual space via the user interface.

In another aspect a method for generating an NFT vault may include receiving, by a user interface, a user input, where the user input comprises token data. Further, the method may include generating, by a processor, a data structure, wherein the data structure associates the user with the token data; encoding, by the processor, an access permission in the data structure, wherein the access permission enables a third-party viewer access to the data structure. Further, the method may include generating, by a processor, a virtual space as a function of the token data. Moreover, the method may include displaying, on the user interface, the virtual space.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a vault of NFTS. In an embodiment, vault of NFTs may include public NFTs. In an embodiment, vault of NFTs may include private NFTS. In an embodiment, vault of NFTs may include user-specific NFTs.

Aspects of the present disclosure can be used to generate a digital arrangement of NFTs. Aspects of the present disclosure can also be used to generate personalized vaults of NFTs. This is so, at least in part, because user token data may be used to generate a personalized vault of NFTs.

Aspects of the present disclosure allow for F. Exemplary embodiments illustrating aspects of the present disclosure are described below in the context of several specific examples.

Figure 1:
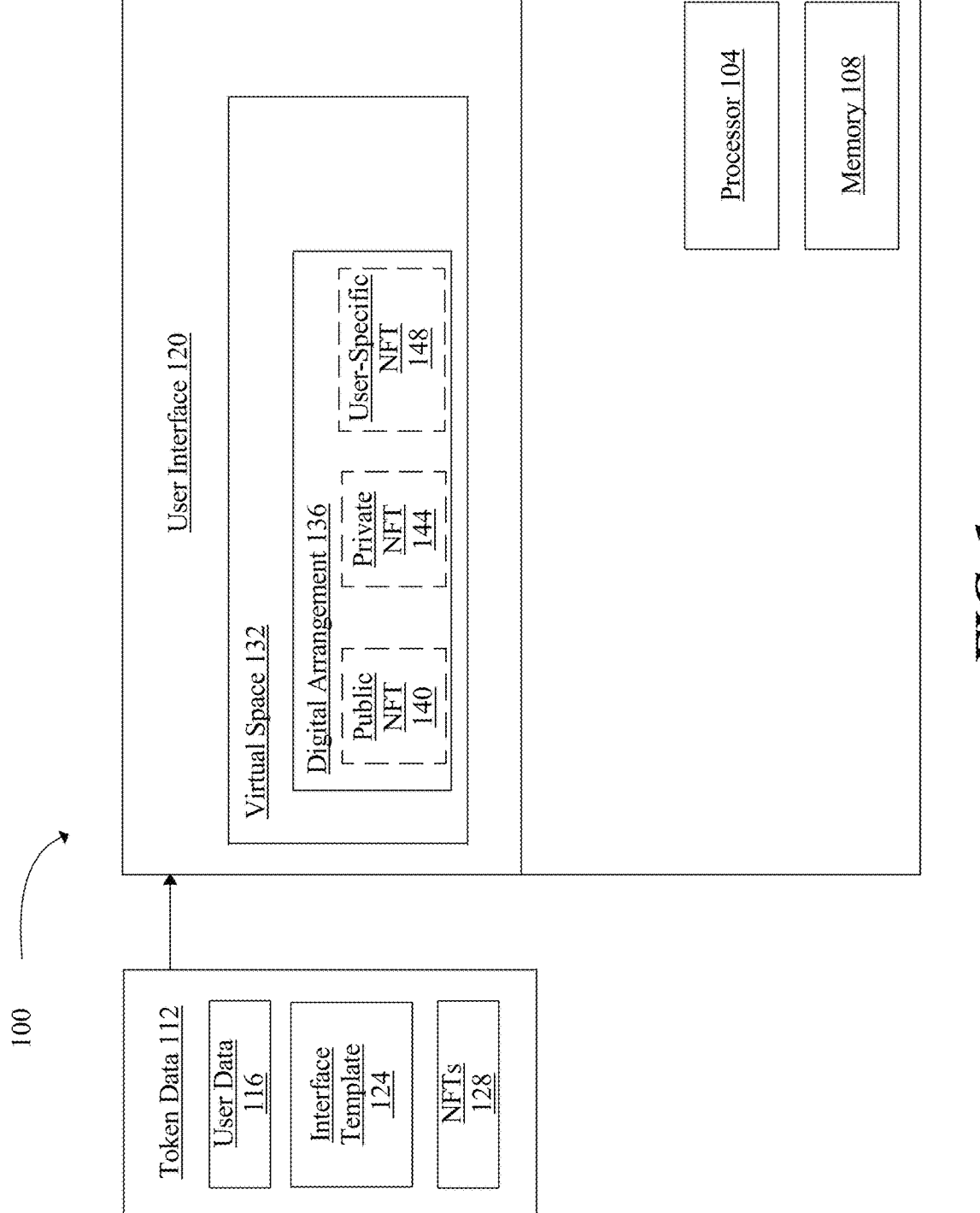
FIG. 1 is block diagram of an apparatus for generating an NFT vault.

Referring now to FIG. 1, an exemplary embodiment of an apparatus for generating an NFT vault is illustrated. Apparatus 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. apparatus 100 may include a single computing device operating independently, or may include two or more computing device operating in concert, in parallel, sequentially or the like; two or more computing devices may be included together in a single computing device or in two or more computing devices. apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. apparatus 100 may include but is not limited to, for example, a computing device or cluster of computing devices in a first location and a second computing device or cluster of computing devices in a second location. apparatus 100 may include one or more computing devices dedicated to data storage, security, distribution of traffic for load balancing, and the like. apparatus 100 may distribute one or more computing tasks as described below across a plurality of computing devices of computing device, which may operate in parallel, in series, redundantly, or in any other manner used for distribution of tasks or memory between computing devices. apparatus 100 may be implemented using a "shared nothing" architecture in which data is cached at the worker, in an embodiment, this may enable scalability of system 100 and/or computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus may include a processor 104 and a memory 108. Processor 104 may be communicatively connected to memory 108. In some embodiments, memory 108 may contain instructions that may configure processor 108 to perform actions. It should be noted that upon reading this disclosure, one or ordinary skill in the art would be knowledgeable of the method and means that the processor 104 and memory 108 may be connected.

With continued reference to FIG. 1, apparatus 100 may receive a user input including token data 112. As used in this disclosure, "token data" is user-specific information related that may give a user access to a platform. Token data 112 may include digital file assets, digital tokens, multimedia, and the like. In some embodiments, token data 112 may include user data 116. "User data," as used herein, is documentational data related to a user. In some embodiments, user data may contain documentation of Intellectual Property rights, to token data. As used in this disclosure, a "documentation" is a source of information. In some cases, documentation may include electronic document, such as, without limitation, txt file, JSON file, word document, pdf file, excel sheet, image, video, audio, and the like thereof. As used in this disclosure, a "smart assessment" is a set of questions that asks for user's information as described in this disclosure, wherein each question contains answers that influences user authentication, verification, and any processing step described in this disclosure. In some cases, questions within smart assessment may include selecting a selection from plurality of selections as answer. In other cases, questions within smart assessment may include a free user input as answer. In a non-limiting example, smart assessment may include a question asking the user regarding percentage of intellectual property (IP) ownership; for instance, the question may be "Does user/entity have all rights in their intellectual property?" In some cases, smart assessment may be in a form such as, without limitation, survey, transactional tracking, interview, report, events monitoring, and the like thereof. In some embodiments, smart assessment may include a data submission of one or more documentations from the user. As used in this disclosure, a "data submission" is an assemblage of data provided by the user as an input source. In a non-limiting example, data submission may include user uploading one or more data collections to processor 108. As used in this disclosure, a "documentation" is a source of information. In some cases, documentation may include electronic documents, such as, without limitation, txt file, JSON file, word document, pdf file, excel sheet, image, video, audio, and the like thereof. In a non-limiting example, documentation may include user data, and may be input source of data submission for further processing. Further processing may include any processing step described below in this disclosure. Additionally, or alternatively, user data may include one or more answers of smart assessment. In a non-limiting example, each data object may represent a single question within smart assessment and corresponding answer to the single question. Collecting data may be accomplished using any method described herein and performed, without limitation, as described in U.S. Non-Provisional application Ser. No. 17/984,912, filed on Nov. 10, 2022, and entitled "APPARATUS AND METHOD FOR VETTING A USER USING A COMPUTING DEVICE," the entirety of which is incorporated herein by reference. User may be sorted to a category as a function of user data 112. In some embodiments, user categories may include such as creator, collector, (collaborator, and/or community member. Sorting user to categories may be performed, without limitation, as described in U.S. Non-Provisional application Ser. No. 17/984,678, filed on Nov. 10, 2022, and entitled "APPARATUS AND METHOD FOR GENERATING USER-SPECIFIC SELF-EXECUTING DATA STRUCTURES," the entirety of which is incorporated herein by reference.

Still referring to FIG. 1, token data 116 may be input into a user interface 120. A "user interface," as used herein, is a means by which a user and a computer system interact; for example through the use of input devices and software. A user interface 120 may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface 120 in virtual reality. In some embodiments, a user may interact with the use interface using a computing device distinct from and communicatively connected to apparatus 100. For example, a smart phone, smart, tablet, or laptop operated by the user. In an embodiment, user interface 120 may include a graphical user interface. A "graphical user interface (GUI)," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface 120 may be directly influenced using graphical control elements such as widgets. A "widget," as used herein, is a user control element that allows a user to control and change the appearance of elements in the user interface 120. In this context a widget may refer to a generic GUI element such as a check box, button, or scroll bar to an instance of that element, or to a customized collection of such elements used for a specific function or application (such as a dialog box for users to customize their computer screen appearances). User interface 120 controls may include software components that a user interacts with through direct manipulation to read or edit information displayed through user interface 120. Widgets may be used to display lists of similar items, navigate the system using links, tabs, and manipulate data using check boxes, radio boxes, and the like. Still referring to FIG. 1, an "NFT (non-fungible token)," as used in this disclosure, is a unique and non-interchangeable unit of data stored on a digital ledger and/or immutable sequential listing. NFT may be associated with reproducible digital files such as photos, videos, and audio. NFT may also be associated with physical assets such as real estate, collectables, and other commodities. An NFT may represent all or a portion of user data as described further below. In embodiments, the type and amount of user data that is represented in the NFT may be determined the preference of the user. The creator or user may "tokenize" such assets to be stored on a digital ledger and/or immutable sequential listing, which may ensure non-duplicability and ownership, generate income, and/or enable accessibility of the assets. Persons skilled in the art, upon reviewing the entirety of this disclosure, will be aware of the various embodiments and purposes of tokenizing an asset.

Still referring to FIG. 1, user interface 120 include may a carousel widget. A "carousel widget," as used herein, is a graphical widget used to display visual cards in a way that's quick for users to browse. For example, NFTs may be displayed as visual cards that may slide, fade, collapse, zoom, minimize, enlarge, open, move in and out of view, and the like in response to mouse or touch interaction. In some embodiments, user interface 120 may include a cover flow widget. A "cover flow widget," as used herein in, is an animated, three-dimensional widget for visually flipping through media. For example, NFTs may be flipped through using an on-screen scrollbar, mouse wheel, gestures, or by selecting a file from a list, which flips through the pages to bring the associated image into view. In some embodiments, a widget may include a collapsible panel, which, as used herein, is a panel that can compactly store content which is hidden or revealed by clicking the tab of the widget. A widget may include a window, which, as used herein, is a graphical control element consisting of a visual area containing some of the graphical user interface elements of the program it belongs to. A widget may include an accordion, which, as used herein, is a vertically stacked list of items, such as labels or thumbnails where each item can be "expanded" to reveal the associated content. A widget may include a dialog box, which, as used herein, is a small window that communicates information to the user and prompts a response. A widget may include a palette window, which, as used herein, is a graphical control element which floats on top of all regular windows and offers ready access tools, commands, or information for the current application. A widget may include a frame, which, as used herein, is a type of box within which a collection of graphical control elements can be grouped as a way to show relationships visually. Additionally a widget may include a canvas, which, as used herein, is a generic drawing element for representing graphical information Still referring to FIG. 1, user interface 120 may include a media player. A "media player," as used herein, is a software program playing multimedia computer files like audio and video files. In some embodiments, the media player may play and display video NFTs and audio NFTs received from token data 112. The media player may include control icons such as play, pause, fast forward, back forward, and stop icons. The media player may include a progress bar. A "progress bar," as used herein, is s a graphical control element used to visualize the progression of an extended computer operation, such as a download, file transfer, or installation. Sometimes, the graphic is accompanied by a textual representation of the progress in a percent format. The concept can also be regarded to include "playback bars" in media players that keep track of the current location in the duration of a media file. Additionally, the media player may include a seek bar. A "seek bar," as used in this disclosure, is an extension of the progress bar that adds a draggable thumb. The user can touch the thumb and drag left or right to set the current progress level or use the arrow keys. The media player may include a timer with the current and total playback time, playlists, a "repeat" mode, and a "shuffle" (or "random") mode for curiosity and to facilitate searching long timelines of files. Options to change the video's scaling and aspect ratio may include filling the viewport through either stretching or cropping, and "100% view" where each pixel of the video covers exactly one pixel on the screen. Zooming into the field of view during playback may be implemented through a slider on any screen or with pinch zoom on touch screens and moving the field of view may be implemented through scrolling by dragging inside the view port or by moving a rectangle inside a miniature view of the entire field of view that denotes the magnified area. Media player software may have the ability to adjust appearance and acoustics during playback using effects such as mirroring, rotating, cropping, cloning, adjusting colors, deinterlacing, and equalizing and visualizing audio.

Still referring to FIG. 1, token data 112 may include an interface template 124. An "interface template," as used herein, is a default display arrangement of token data. For example, apparatus 100 may receive user data 116, display NFTs 128 and other elements of user data using a carousel widget. Processor 104 may render the interface template 128 using a machine-learning model, such as a classifier, to organize data in a template. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, computing device 104 may generate and train a template classifier configured to receive user data 116 and output a display arrangement of NFTs, the interface template 128. Processor 104 and/or another device may generate a classifier using a classification algorithm, defined as a processes whereby a processor 104 derives a classifier from training data. In some embodiments, template classifier training data may include a plurality of model widget characteristics. For example, a model carousel widget displaying an energetic flow pattern, color scheme, color or size-based ordering of media, alphabetical order of media and the like. Additionally, training data may include user data 116 correlated to other components of training as described herein, such as market as described below, and model widgets emphasized based on data quantity and or formatting. Models of widget characteristics may be used to train template classifier to optimize arrangement of data displayed through user interface template 128. For example, a model cover flow widget to display a large plurality digital artwork NFTs. Models of widget characteristics may derive from a widget toolkit a part of the training data. A "widget toolkit," as used in this disclosure, is library containing widgets used to construct a user interface. For example, the widget toolkit may include menus, buttons, sliders, windows, text boxes and toolbars and the like. In some embodiments training data may include market data. "Market data," as used herein are data regarding an NFT's marketability in a digital marketplace. Market data may include statistics related to NFTS, digital tokens, crypto, digital marketplaces, and the like. Market data statistics may be used to place priority in display arrangement, and/or market value on token data 116. Market data statistics may relate to sales, demographics, sectors (e.g., art, games, music. And the like), popularity, marketplace history, any combination thereof and the like. For example, market data statics may include, most popular and lucrative NFT marketplace, highest sold NFT in an art sector, the rise in popularity of sport related NFTs, trends in music NFTs, and the like. Market data statistics may be displayed as part of user data as described further below. In some embodiments, market data statistics may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape statistics from a plurality of NFT, crypto, and/or marketplace resource forums/websites. The web crawler may be seeded and/or trained with a reputable website, such as crypto.com, to begin the search. A web crawler may be generated by a computing device 104. In some embodiments, the web crawler may be trained with information received from a user through user interface 120. In some embodiments, the web crawler may be configured to generate a web query. A web query may include search criteria received from a user. For example, a user may submit a plurality of websites for the web crawler to search to extract market data statistics from and correlate to user data 116, such as aesthetics based on price, popularity, bid history search criteria, and the like. Additionally, the web crawler function may be configured to search for and/or detect one or more data patterns. Curating a marketplace may be accomplished using any method described herein and performed, without limitation, as described in U.S. Non-Provisional application Ser. No. 17/984,620, filed on Nov. 10, 2022, and entitled "APPARATUSES AND METHODS FOR CURATING NFTS," the entirety of which is incorporated herein by reference. A "data pattern" as used in this disclosure is any repeating forms of information. A data pattern may include repeating market data statistics related to user data 116. For example, an NFT image of a lion may have a data pattern of selling the quickest in a marketplace. In some embodiments, the web crawler may be configured to determine the relevancy of a data pattern. Relevancy may be determined by a relevancy score. A relevancy score may be automatically generated by a processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for price values on video NFTs. The web crawler may return price value statics results of video NFTs. In some embodiments, the computing device may determine a relevancy score of price value statice as it relates to user data 116. For example, a price value of a 3 second GIF NFT may score as more relevant to user data 116 than a 5 second GIF NFT.

Still referring to FIG. 1, processor 104 may generate a data structure. In some embodiments, data structure may associate a user with token data 112. It should be noted that a user may input token data 112, but token data 112 may be retrieved from a database associated with a user. In some instances, data structure may be encoded with an access permission. As used in this disclosure, an "access permission" is a code that enables third-party viewers access to a data structure. As a non-limiting example, data structure, including an access permission, may be generated by a first user. If a second user has the code associated with the access permission, then the second user may be granted access to data structure. Further, data structure may be utilized to generate a virtual space 132. In some embodiments, a user may be prompted to provide authorization credentials associated with the access permission. In some instances, authorization credentials may be included in token data. It should be noted that authorization credentials may include, but are not limited to, numerical codes, alphanumerical codes, images, voice memos, biometric scans, or things of the like.

Still referring to FIG. 1, processor 104 may generate a virtual space 132 on user interface 120. As used in this disclosure, a "virtual space" is a virtual representation of an area containing one or more digital NFTs. As a non-limiting example, generating virtual space 132 may include displaying information in a user interface 120 based on user input. In some embodiments, parameters of virtual space 132 may be included in interface template 124. As a non-limiting example, an alternative to a user manual clicking and dragging token data 112 to be displayed in order of a linear gradient color scheme, processor 104 may receive an interface command to order token data 112 as such and automatedly output a digital arrangement 136 displaying token data 112 ordered based on a linear color gradient. As a function of generating a digital arrangement 136, processor 104 may configured to remove interface template 128 from display in user interface 120 and only display raw token data 112.

Still referring to FIG. 1, digital arrangement 136 may include one or more categories of NFTs. In some embodiments, digital arrangement 136 may include public NFTs 140. As used in this disclosure, "public NFTs" are non-fungible tokens that are accessible via a public platform. As a non-limiting example, public NFTs 140 may be available from any open-source website that may be accessed via n internet connection. In some embodiments, token data 112 may include public NFTs 140. In some embodiments, token data 112 may include web addresses that may be the location of public NFTs 140. In some instances, processor 104 may use a WebCrawler to navigate to the web addresses to receive public NFTs 140. Once retrieved, processor 104 may organize public NFTs 140 on user interface 120 in a digital arrangement 136. In some instances, processor 104 may organize public NFTs 140 on user interface 120 as a function of interface template 124.

Still referring to FIG. 1, digital arrangement 136 may include private NFTs 144. As used in this disclosure, "private NFTs" are non-fungible tokens that are only accessible to an individual entity or a select group of entities. As a non-limiting example, private NFTs 144 may stored locally on a remote computing device. In some instances, private NFTs 144 may be stored in a cloud storage. In either instance, private NFTs 144 may include an access restriction. Access restriction may include password protection, a key and token pair, reCAPTCHA authentication, or things of the like. In some embodiments, token data 112 may include authorization credentials. Authorization credentials may be needed to access one or more private NFTs 144. In some instances, authorization credentials in an image format.

Still referring to FIG. 1, processor 104 may receive a user data that may include authorization credentials. In some instances, textual input may be a character string unique to a user. As a non-limiting example, when compiling a list or database of authorized users, processor 104 may distribute unique authorization credentials to each of the authorized users. Thus, each authorized user may receive a unique credential to use for later verifications. Upon submitting an authorization, a user may provide the unique authorization credentials to processor 104. In some embodiments, authorization credentials may be an image, such as without limitation an image of a verifier. Image may be any image containing data that may be extracted by processor 104 using OCR. As a non-limiting example, image may include an image of an ID card, credit card, social security card, or any other suitable credential. Authorization credentials that may be an image may be provided to a user upon creating of a list or database of authorized users, as described herein. It should be noted that processor 104 may create a series of unique authorization credentials, store them in a database, and send all the unique authorization credentials to their respective users in real-time.

With continued reference to FIG. 1, by creating the authorization credentials simultaneously, the probability of creating a duplicate may be lessened. Upon reading this disclosure, one of ordinary skill in the art would understand that the credentials analyzed by OCR techniques may create complex authorized credentials that may prevent fraudulent attempts to access private NFTs 144. In some embodiments, authorization credentials may be encrypted. In some instances, encrypted authorization credentials may be compared to stored encrypted authorization credentials to authenticate a user. In some embodiments, authorization credentials may be encrypted initially and decrypted to compare to decrypted stored authorization credentials. Encrypting authorization credentials may serve as an additional fail-safe for fraudulent NFT access. Additionally, encryption may compress an amount of data transferred across a network. Thus, encryption of authorization credentials may reduce time elapsed during packet transmission.

Upon reading this disclosure, one of ordinary skill in the art would know the various methods for encrypting authorization credentials.

With continued reference to FIG. 1, in some embodiments, authorization of the user may include authorization thereof using an authorization machine learning model. Authorization machine learning model may be consistent with any other machine learning model disclosed in this disclosure. Authorization machine learning model may be trained using verification training data. Authorization training data may include authorization credentials of users correlated to authorization status data. In some embodiments, authorization credentials in verification training data may include images of verifiers, ID cards, certificates, diplomas, and the like. In some embodiments, authorization credentials in verification training data may be processed using OCR as discussed above; in other words, OCR process may be used to generate textual data from a plurality of documents entered as training examples, such as past documents. An "authorization status," for the purposes of this disclosure, is a datum indicating whether or not a verifier is authorized. For example, verification status may include "yes," "no," and/or "indeterminate." Authorization machine learning model may be configured to take authorization credentials as input and output authorization statuses. Processor 104 may be configured to input the authorization credential of the verifier 116 and receive as output from the verification machine learning model a verification status.

Still referring to FIG. 1, authorization may include, without limitation, matching image data to known and/or verified image data, such as without limitation a stored, previously authenticated, and/or user verified image of a verifier and/or authorized person. Image classifier may include without limitation any classifier as described in this disclosure. Image classifier may be trained, without limitation, using training data containing images of a type to be matched, such as images of faces, with user-entered or otherwise generated indications of identity, images of matching and non-matching faces or other matter, or the like; thus image classifier may be trained to detect whether a face depicted in a given image matches a face depicted in a stored image, or otherwise match a subject of an image to a subject of another image.

Continuing to refer to FIG. 1, processor 104 may use interpolation and/or upsampling methods to process authorization credentials. For instance, where authorization credentials include image data, processor 104 may convert a low pixel count image into a desired number of pixels need to for input into an image classifier; as a non-limiting example, an image classifier may have a number of inputs into which pixels are input, and thus may require either increasing or decreasing the number of pixels in an image to be input and/or used for training image classifier, where interpolation may be used to increase to a required number of pixels. As a non-limiting example, a low pixel count image may have 100 pixels, however a number of pixels needed for an image classifier may be 128. Processor 104 may interpolate the low pixel count image to convert the 100 pixels into 128 pixels so that a resultant image may be input into an image classifier. It should be noted that image classifier may be any classifier as described in this disclosure. It should also be noted that one of ordinary skill in the art, upon reading this disclosure, would know the various methods to interpolate a low pixel count image to a desired number of pixels required by an image classifier. In some instances, a set of interpolation rules may be trained by sets of highly detailed images and images that may have been downsampled to smaller numbers of pixels, for instance and without limitation as described below, and a neural network or other machine learning model that is trained using the training sets of highly detailed images to predict interpolated pixel values in a facial picture context. As a non-limiting example, a sample picture with sample-expanded pixels (e.g., pixels added between the original pixels) may be input to a neural network or machine-learning model and output a pseudo replica sample-picture with dummy values assigned to pixels between the original pixels based on a set of interpolation rules. In some instances, image classifier and/or another machine-learning model may have a set of interpolation rules trained by sets of highly detailed images and images that have been downsampled to smaller numbers of pixels, and a neural network or other machine learning model that is trained using those examples to predict interpolated pixel values in a facial picture context. I.e., you run the picture with sample-expanded pixels (the ones added between the original pixels, with dummy values) through this neural network or model and it fills in values to replace the dummy values based on the rules Still referring to FIG. 1, processor 104 may utilize sample expander methods, a low-pass filter, or both. As used in this disclosure, a "low-pass filter" is a low-pass filter is a filter that passes signals with a frequency lower than a selected cutoff frequency and attenuates signals with frequencies higher than the cutoff frequency. The exact frequency response of the filter depends on the filter design. In some embodiments, processor 108 may use luma or chroma averaging to fill in pixels in between original image pixels. Processor 108 may down-sample image data to a lower number of pixels to input into an image classifier. As a non-limiting example, a high pixel count image may have 256 pixels, however a number of pixels need for an image classifier may be 128. Processor 108 may down-sample the high pixel count image to convert the 256 pixels into 128 pixels so that a resultant image may be input into an image classifier.

In some embodiments, and with further reference to FIG. 1, processor may be configured to perform downsampling on data such as without limitation image data. For instance, and without limitation, where an image to be input to image classifier, and/or to be used in training examples, has more pixel than a number of inputs to such classifier. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Continuing to refer to FIG. 1, authorization training data may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine-learning processes, models, and/or classifiers as described in further detail below.

Referring still to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database, a key-value retrieval datastore such as a NOSQL database, or any other format or structure for use as a datastore that a person skilled in the art would recognize as suitable upon review of the entirety of this disclosure. An image database may include a plurality of data entries and/or records corresponding to user tests as described above. Data entries in an image database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in an image database may reflect categories, cohorts, and/or populations of data consistently with this disclosure. Image database may be located in memory 108 of apparatus 100 and/or on another device in and/or in communication apparatus 100.

Still referring to FIG. 1, an exemplary embodiment of an image database is illustrated. One or more tables in image database may include, without limitation, an image table, which may be used to store images, with links to origin points and/or other data stored in image database and/or used in training data as described in this disclosure. Image database may include an image quality table, where categorization of images according to image quality levels, for instance for purposes of use in image quality-linked training data, may be stored. Image database may include a demographic table; demographic table may include any demographic information concerning users from which images were captured, including without limitation age, sex, national origin, ethnicity, language, religious affiliation, and/or any other demographic categories suitable for use in demographically linked training data as described in this disclosure. Image database may include an anatomical feature table, which may store types of anatomical features, including links to diseases and/or conditions that such features represent, images in image table that depict such features, severity levels, mortality and/or morbidity rates, and/or degrees of acuteness of associated diseases, or the like. Persons skilled in the art, upon reviewing the entirety of this disclosure, will be aware of various alternative or additional data which may be stored in image database.

Still referring to FIG. 1, processor 104 may receive authorization credentials that may include authorization image data. Image data may include pixel data of varying range. In instances where authorization image data does not match stored pixel data, processor 104 may transform authorization image data to stored pixel data. In some embodiments, to authorize a user, processor 104 may compare authorization image data to stored pixel data. In some instances, authorization image data may be transformed from its original state. Processor 104 may compare original authorization image data to stored pixel data. Authorization image data may differ in pixel count, thus, only a percentage of pixel data may match up. As a non-limiting example, at least 90 percent of pixel data may match. It should be noted that a percent match may be at least 95 percent, at least 90 percent, at least 80 percent, or the like. Processor may flag any user that sends authorization credentials that have less than the specified amount of pixel data matchup.

Still referring to FIG. 1, authorization credentials may be digital signatures. As a non-limiting example, user may use a device capable of fingerprinting. In some instances, authorization credentials may be a digital fingerprint. In some embodiments, digital fingerprint may be a digital scan of a user's finger, face, or any identifying feature. Digital fingerprint may be stored in a database and retrieved upon processor 108 receiving authorization credentials from user. Digital fingerprint received from user may be compared to a stored fingerprint associated with user using methods described above. In some instances, digital fingerprint may be an image of an identifying feature. A certainty percentage threshold may be lower for an image of identifying feature in comparison to a digital fingerprint to account for confounding variables including but not limited to camera quality, formatting, transmission packet loss, or the like.

With continued reference to FIG. 1, processor 104 may receive an IP address associated with a known location of a user. Authorization credentials may include IP address. In some embodiments, IP address may be appended to any data packet containing authorization credential data. In some instances, time elapsed during data transmission may be used to authorize user. As a non-limiting example, time elapsed may be the time it takes for a data packet to be transmitted between an apparatus associated with user and processor 104. In some embodiments, time elapsed may be the time it takes for a first data packet to be transmitted from a computing device associated with user to processor 104 and a second data packet transmitted from processor 104 to user. Processor 104 may authorize user as a function of time elapsed by comparing actual time elapsed to an expected time elapsed. Expected time elapsed may be calculated as function of network latency, expected data packet size, and the like. In instances of fraud attempts, processor 104 may determine that time elapsed is below a certainty percentage threshold as described above. As a non-limiting example, a spoof account may be located in different location than user. Therefore, data packet transmission may take more or less time than expected. Accordingly, processor 104 may flag spoof account as fraudulent. In some instances, data packet transmission may take more or less time than expected. Accordingly, processor 104 may flag fraudulent verifier as fraudulent. It should be noted that IP addresses associated with flagged accounts may be stored in a database to preserve computational resources if multiple fraudulent attempts come from the same account. As a non-limiting example, processor 104 may receive fraudulent authorization credentials data packet with a flagged IP address appended to the data packet. Processor 104 may compare the data packet to stored flagged IP addresses. If the IP address appended to the data packet matches a stored flagged IP address, processor 108 may not authorize user. It should be noted that flagged IP addresses may be added manually by a user.

Still referring to FIG. 1, digital arrangement 136 may include user-specific NFTs 148. As used in this disclosure, "user-specific NFTs" are non-fungible tokens that are personalized to a user. As a non-limiting example, user specific NFTs 148 may be stored locally on a remote computing device. In some instances, user-specific NFTs 144 may be stored in a cloud storage. In either instance, user-specific NFTs 148 may include a personalization of interface template 124 and/or one or more personalized NFTs.

Still referring to FIG. 1, user-specific NFTs 148 may include NFTs that may have different formatting than digital arrangement 136 may require. As a non-limiting example, user-specific NFT 148 may be in 128×128 pixel format.

However, digital arrangement 136 may require a 256×256 pixel format. Accordingly, memory 108 may store code that when executed by processor 104 may cause processor 104 to reformat user-specific NFTs 148. Continuing the non-limiting example, processor 104 may reformat user-specific NFTs from 256×256 pixels to 128×128 pixels. Reformatting may be done utilizing methods of interpolation, upsampling, downsampling, or the like, as described herein. Upon review of this disclosure, one of ordinary skill in the would be knowledgeable of methods for reformatting. In some embodiments, digital arrangement 136 may require the same format as user-specific NFTs 148. Additionally, or alternatively, digital arrangement 136 may not require a format. As a non-limiting example, one or more user-specific NFTs 148 may have one or more formats, respectively. Processor 104 may generate digital arrangement 136 with various user-specific NFTs 148 having various formats, respectively.

Still referring to FIG. 1, digital arrangement 136 may include public NFTs 140, private NFTs 144, user-specific NFTs 148, or the like. In some embodiments, public NFTs 140, private NFTs 144, and user-specific NFTs 148 may be displayed simultaneously. As a non-limiting example, public NFTs 140, private NFTs 144, and user-specific NFTs 148 may be disposed adjacent to one another, even if formats differ. In some instances, virtual space 132 may be generated in 3-dimension. As a non-limiting example, virtual space 132 may emulate a museum. In some embodiments, virtual space 132 may emulate a museum. Virtual space 132 may include NFTs as pseudo attractions. In some instances, virtual space 132 may include exhibits. As used in this disclosure, "exhibits" may be a display of one or more NFTs associated having a common category.

Still referring to FIG. 1, virtual space 132 may be displayed on user interface 120. As a non-limiting example, a user may have the ability to navigate through virtual space 132 via user inputs. In some embodiments, user may be able to navigate through virtual space 132 via a textile input. In some embodiments, input may be vocal and/or textual. In some instances, virtual space 132 may be resident on an application. As a non-limiting example, virtual space 132 may be accessible via executing a viewer application. Viewer application may be any suitable viewer application that permits a user to navigate through a space via inputs. In some embodiments, viewer application may be stored in memory 108. In some embodiments, access to viewer application may granted through user data 116. User data 116 may include credentials associated with a user and viewer application.

Figure 2:
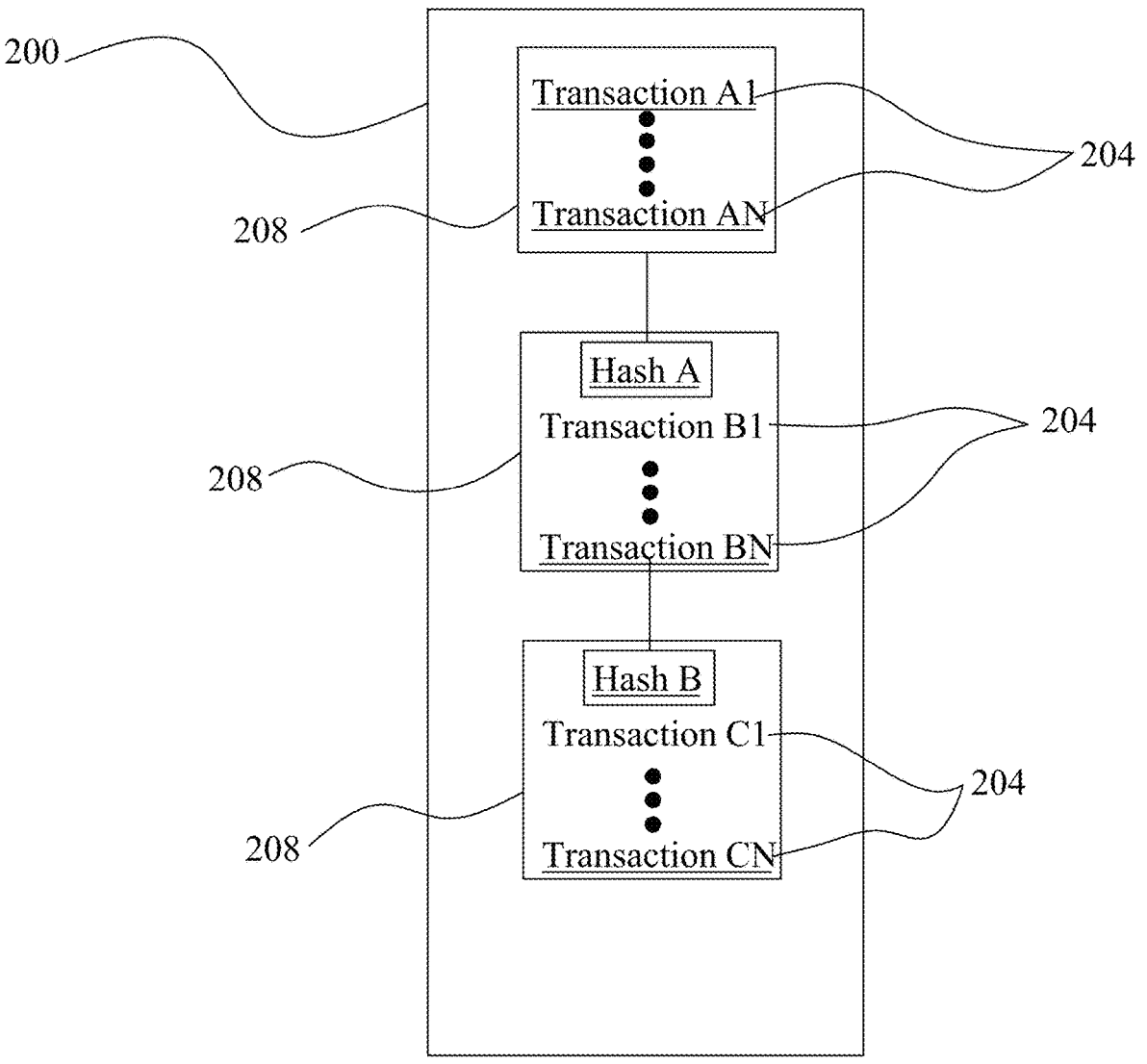
FIG. 2 is a block diagram of exemplary embodiment of an immutable sequential listing.

Referring now to FIG. 2, an exemplary embodiment of an immutable sequential listing is illustrated 200. An immutable sequential listing 200 may be, include and/or implement an immutable ledger, where data entries that have been posted to immutable sequential listing 200 cannot be altered. Data elements are listed in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. Digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

Still referring to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Figure 3:
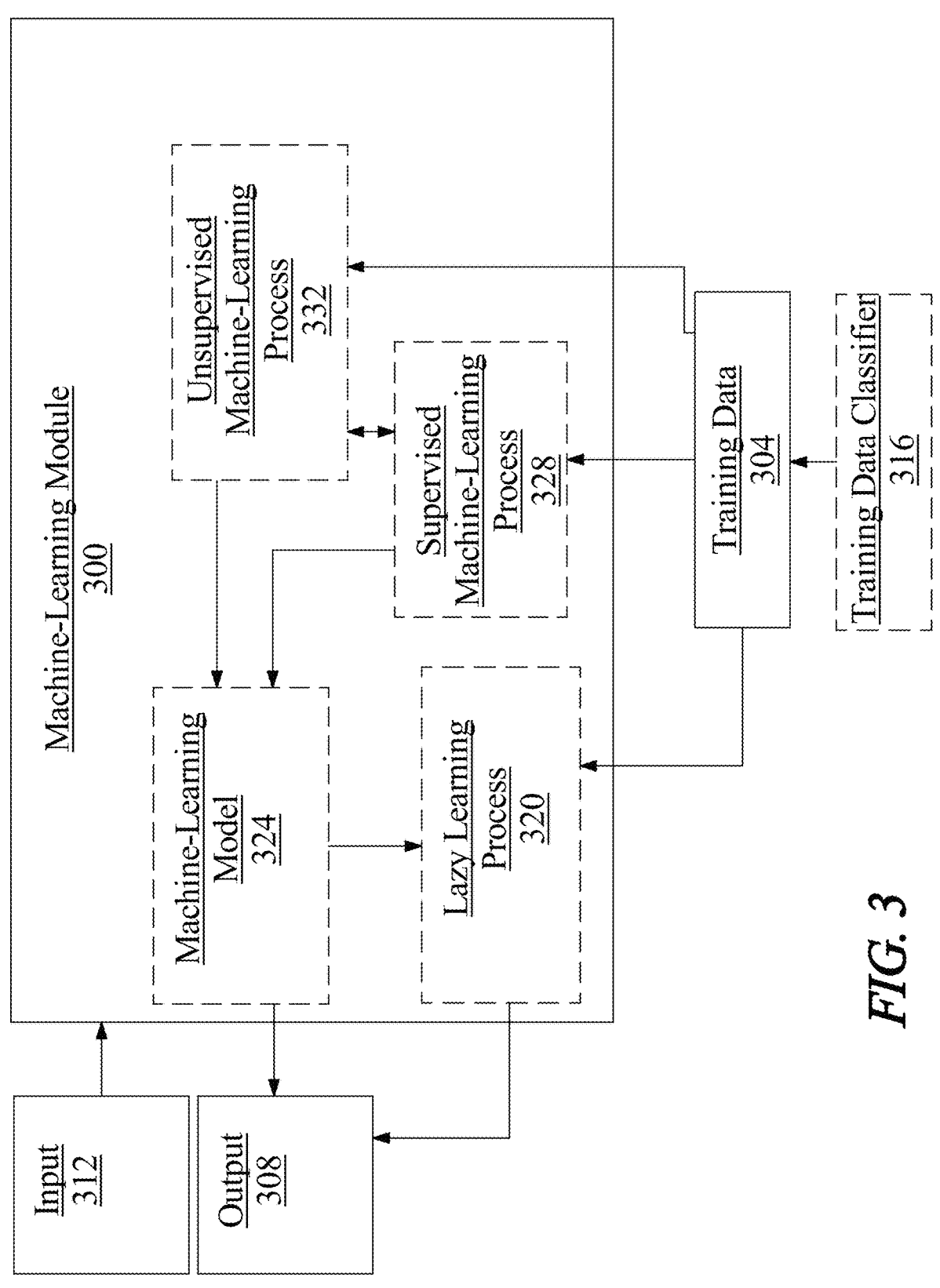
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
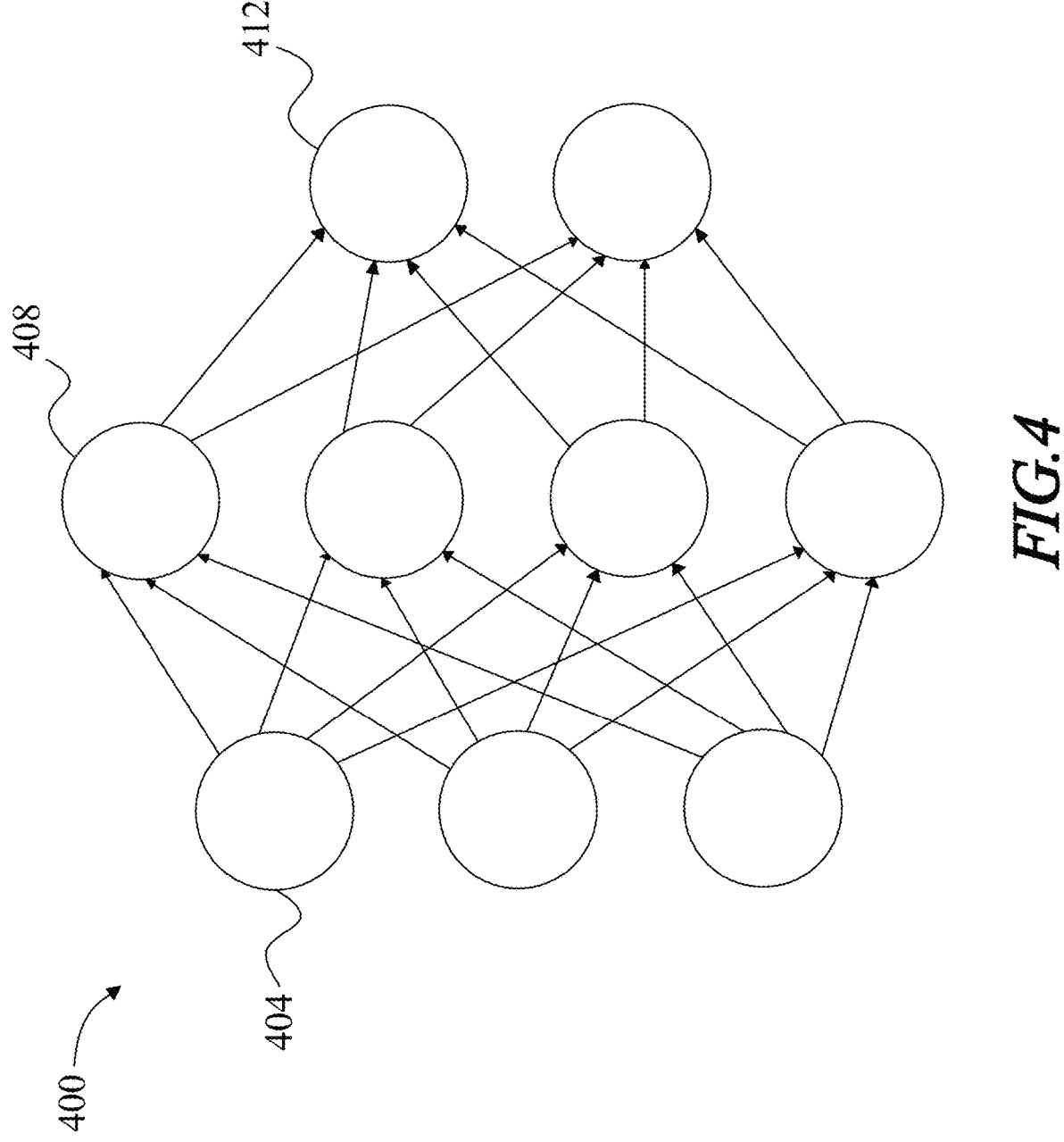
FIG. 4 is a diagram of an exemplary nodal network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
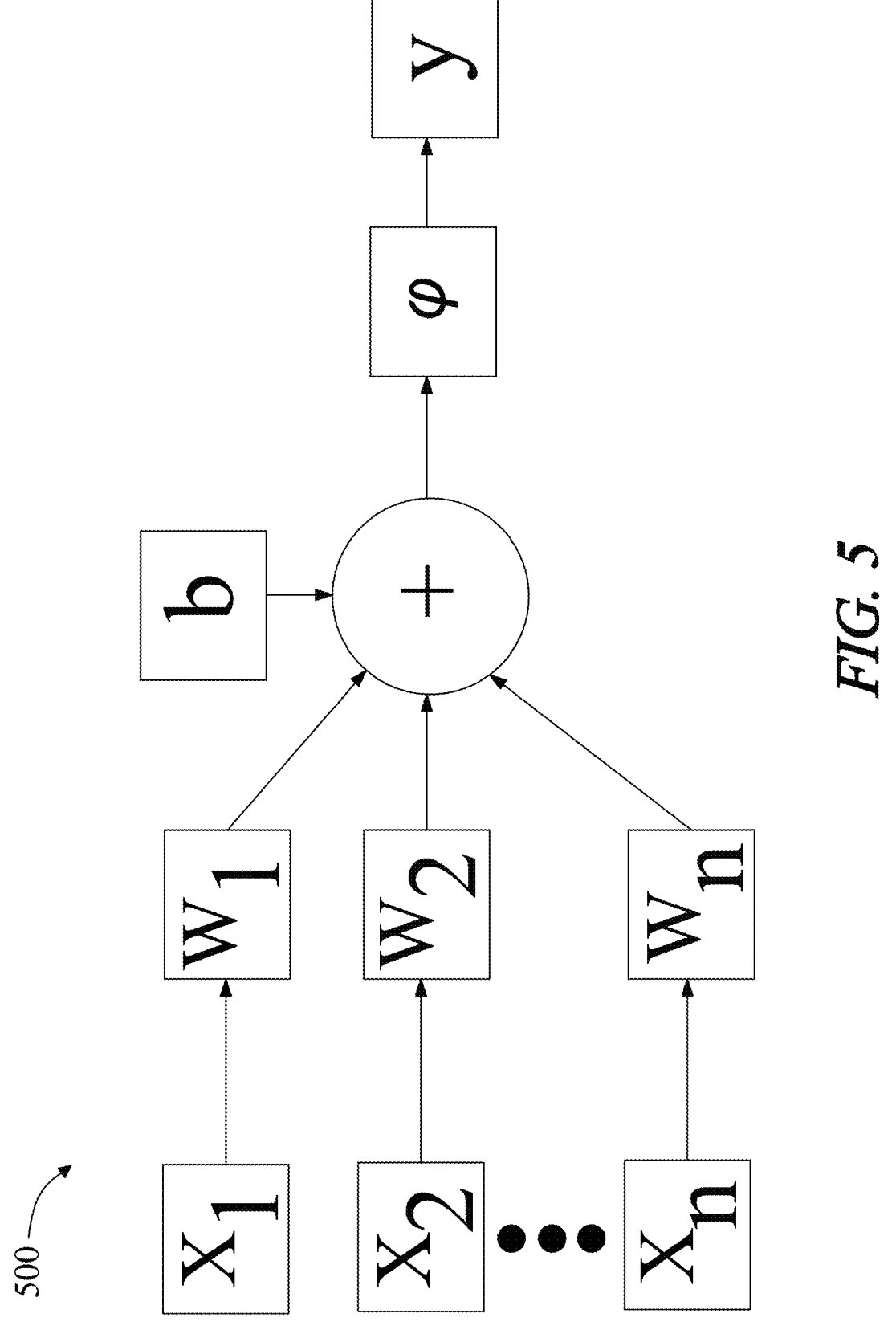
FIG. 5 is a block diagram of an exemplary node.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
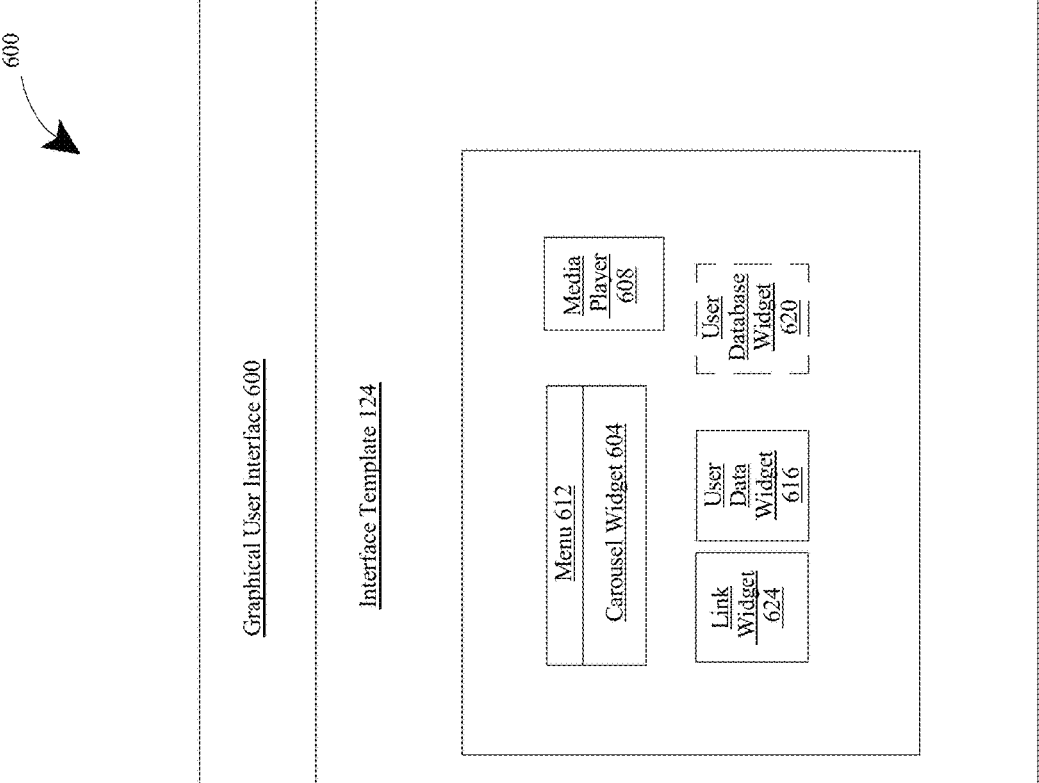
FIG. 6 is a block diagram of an exemplary graphical user interface.

Referring now to FIG. 6 is a diagram of an exemplary graphical user interface (GUI) 600. GUI 600 may include an interface template 124. Interface template 124 may include a plurality of widgets as described in FIG. 1. Interface template 124 may include a carousel widget 604 to display token data 112 such as NFTs 128. The carousel may include a 2D or 3D appearance. Carousel widget 604, and other display widgets as described in this disclosure, may include a responsive/fluid layout with auto scale function; scroll and/or drag and swipe functions for the desktop and mobile devices; lazy scrolling/loading, the possibility to initialize the carousel on scroll when the product is visible in the page, this way for example if the product is in a section of a webpage that is not visible it will not be initialized/load images, instead the carousel will be initialized/load images only when the user is scrolling to that section in which the carousel is added; mouse wheel support-navigation with mouse wheel scrolling; keyboard support—the left and right arrows can be used for navigation through the thumbnails; the option to start at a specific category; customizable thumbnails size and topology geometry (i.e., X radius, Y radius, Y offset, X rotation, and the like); customizable/ optional reflection for the thumbnails; customizable description text for the center thumbnail; custom action for the thumbnail click, for example when a thumbnail is clicked the user may choose to do nothing or open a new web page; slideshow with autoplay and customizable slideshow delay; customizable color theme, and the like.

Still referring to FIG. 6, in some embodiments, interface template 124 may include a media player 608 as described in FIG. 1. Media player 608 may work in tandem with the carousel widget 604. For example, when a thumbnail/visual card is selected such as a video NFT, it may be played by the media player. Interface template 124 may include a menu 612 such as a drop down menu wherein a user may select and/or submit user input to alter GUI 600, as described in FIG. 1. A "menu," as used in this disclosure, is navigation tool for operating a user interface. A "drop down menu" is a list of options that is revealed only when a user interacts with the menu, either by clicking it or hovering over it with their cursor. The menu options then descend vertically and disappear again once the user disengages from the menu. In interface template 124 may include a user data widget 616 associated with token data 112. For example, when a NFT is displayed in carousel widget 604, user data widget 616 may be configured to display information associated with the NFT as described in FIG. 1. In some embodiments, GUI 600 may include a user database widget 620 as part of or separate from interface template 124. User database widget 620 may contain and display all token data received by apparatus 100 from a plurality of resource as described above, wherein a user may select what elements of token to be displayed in interface template 128. In some embodiments, interface template may include a link widget 624 to link other webpages or platforms, such as a NFT marketplace as described in FIG. 1.

Figure 7:
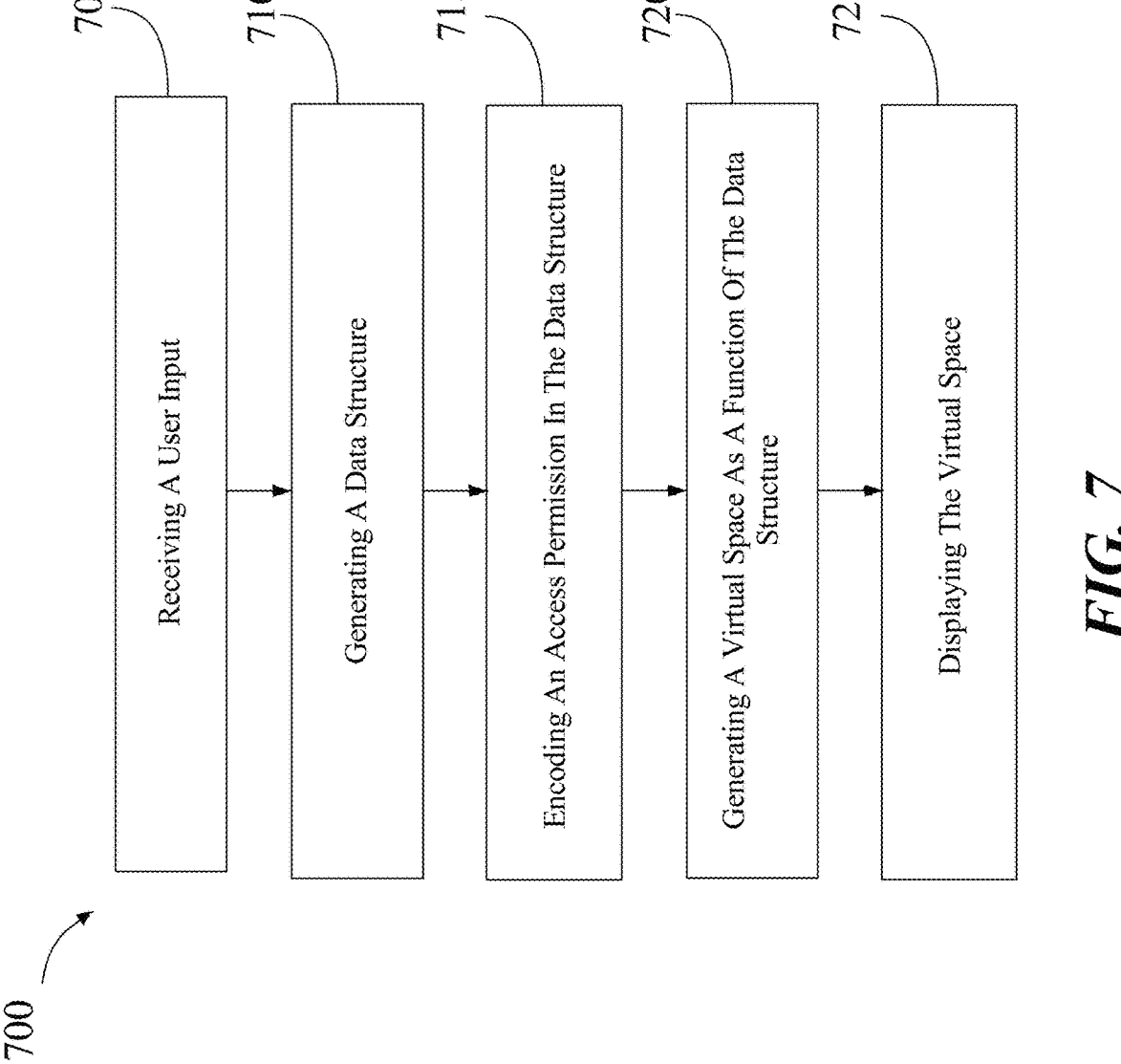
FIG. 7 is a flow diagram illustrating a method of generating an NFT vault.

Referring now to FIG. 7, is a flow diagram for a method 700 for generating an NFT vault. At step 705, method 700 may include receiver a user input via a user interface, where the user input includes token data. In some embodiments, token data may include user data, one or more NFTs, an interface template, or the like. This step may be implemented as described and with reference to FIGS. 1-6.

Still referring to FIG. 7, at step 710, method 700 may include generating a data structure. In some embodiments, data structure may associate a user to token data. This step may be implemented as described and with reference to FIGS. 1-6.

Still referring to FIG. 7, at step 715, method 700 may include encoding an access permission in the data structure. In some embodiments, an access permission may enable a third-party viewer access to the data structure. This step may be implemented as described and with reference to FIGS. 1-6.

Still referring to FIG. 7, at step 720, method 700 may include generating a virtual space as a function of the data structure. In some embodiments, virtual space may include at least a public NFT. In some embodiments, virtual space may include at least a private NFT. In some embodiments, virtual space may include at least a user-specific NFT. In some embodiments, generating the virtual space may include receiving authorization credentials from a user. This step may be implemented as described and with reference to FIGS. 1-6.

Still referring to FIG. 7, at step 725, method 700 may include displaying the virtual space via the user interface. In some embodiments, user interface may include an interface template. In some embodiments, interface template may include a display arrangement. This step may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
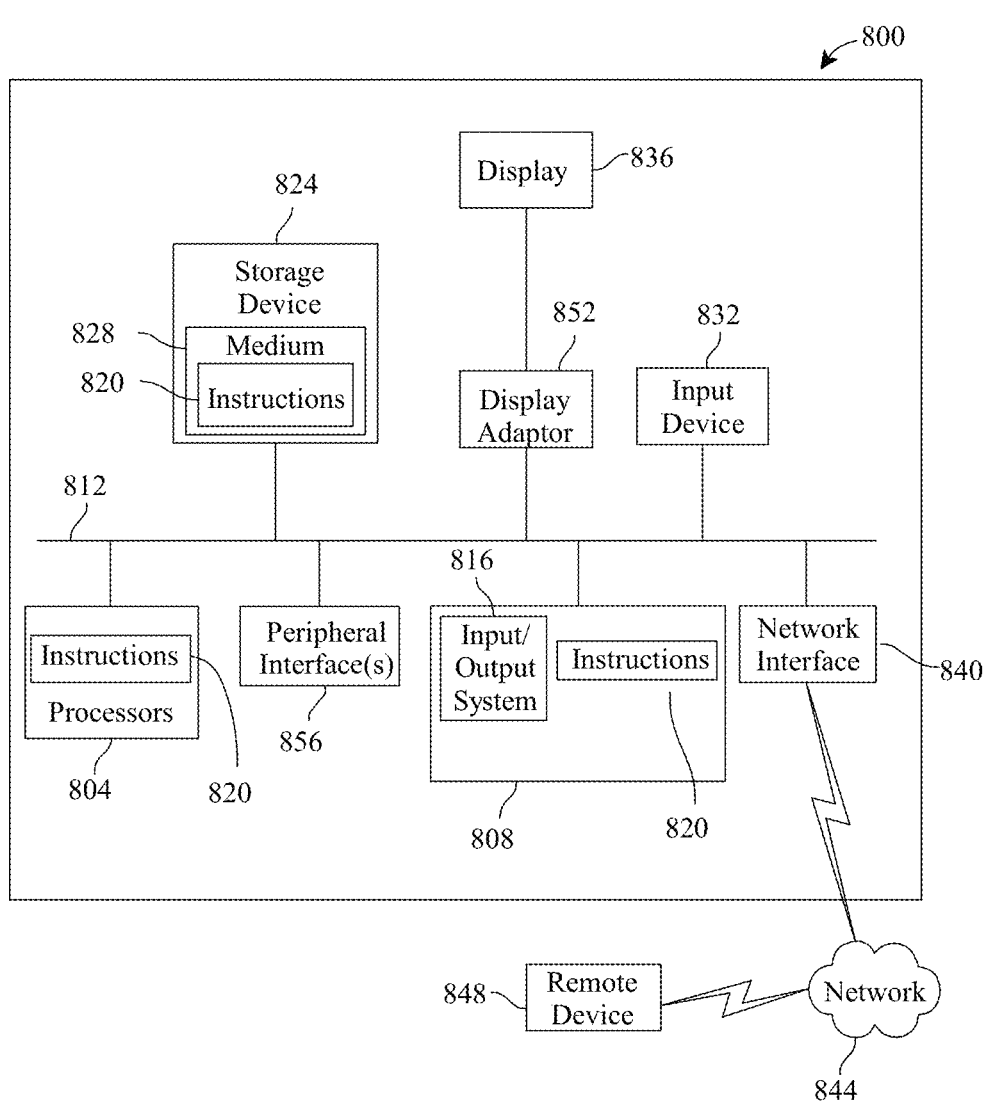
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a non-fungible token (NFT) vault, the apparatus comprising:
   at least a processor; and
   a memory communicatively connected to the at least processor, the memory containing instructions configuring the at least processor to:
   receive a user input via a user interface, the user input comprising token data, wherein the token data comprises authorization credentials;
   authorize a user, wherein authorizing the user further comprises:
      calculating an expected time elapsed as function of network latency and an expected data packet size;
      comparing an actual authorization credential data packet time elapsed to the expected authorization credential data packet time elapsed;
      evaluating the authorization credentials of the token data; and
      authorizing the user as a function of the authorization credentials and the comparison of the credential data packet time;
   generate a data structure, wherein the data structure associates the user with the token data;
   encoding an access permission in the data structure, wherein the access permission enables a third-party viewer access to the data structure;
   generate a virtual space as a function of the data structure;
   store the data structure in one or more privacy-preserving cryptographic data structures, permitting set-membership checking while preventing repeated queries from deanonymizing members; and
   display the virtual space via the user interface, wherein the user interface is configured to allow a user to navigate through a three-dimensional representation of the virtual space through vocal and textual inputs.

2. The apparatus of claim 1, wherein the token data comprises user data.

3. The apparatus of claim 1, wherein the token data comprises an interface template.

4. The apparatus of claim 3, wherein the token data comprises one or more NFTs.

5. The apparatus of claim 4, wherein the interface template comprises a display arrangement of the one or more NFTs associated with the token data.

6. The apparatus of claim 1, wherein the virtual space comprises at least a public NFT.

7. The apparatus of claim 1, wherein the virtual space comprises at least a private NFT.

8. The apparatus of claim 1, wherein the token data allows a user to access user-specific NFTs.

9. A method for generating a non-fungible token (NFT) vault, the method comprising:
   receiving, by a user interface, a user input, wherein the user input comprises token data wherein the token data comprises authorization credentials;
   authorizing, by a processor, a user, wherein authorizing the user further comprises:
      calculating an expected time elapsed as function of network latency and an expected data packet size;
      comparing an actual authorization credential data packet time elapsed to the expected authorization credential data packet time elapsed;

evaluating the authorization credentials of the token data; and
      authorizing the user as a function of the authorization credentials and the comparison of the credential data packet time;
   generating, by the processor, a data structure, wherein the data structure associates the user with the token data;
   encoding, by the processor, an access permission in the data structure, wherein the access permission enables a third-party viewer access to the data structure;
   generating, by the processor, a virtual space as a function of the data structure, wherein generating the virtual space comprises authorizing the user by comparing an actual authorization credential data packet time elapsed to an expected authorization credential data packet time elapsed;
   storing, by the processor, the data structure in one or more privacy-preserving cryptographic data structures, permitting set-membership checking while preventing repeated queries from deanonymizing members; and
   displaying, on the user interface configured to allow a user to navigate through the virtual space through vocal and textual inputs, a three-dimensional representation of the virtual space.

10. The method of claim 9, wherein receiving token data further comprises receiving user data.

11. The method of claim 9, wherein receiving token data further comprises receiving an interface template.

12. The method of claim 11, wherein receiving token data further comprises receiving one or more NFTs.

13. The method of claim 12, wherein receiving the interface template further comprises receiving a display arrangement of the one or more NFTs associated with the token data.

14. The method of claim 9, wherein generating the virtual space further comprises generating at least a public NFT.

15. The method of claim 9, wherein generating the virtual space further comprises generating at least a private NFT.

16. The method of claim 9, wherein receiving token data further comprises allowing a user to access user-specific NFTs.

17. The apparatus of claim 1, wherein the virtual space further comprises at least an exhibit.

18. The method of claim 9, wherein the virtual space further comprises at least an exhibit.

19. The apparatus of claim 1, wherein generating the virtual space further comprises:
   selecting a display arrangement of the non-fungible tokens using a template classifier trained on widget characteristics and market data, wherein the market data is derived from a web crawler configured to retrieve content, index the content, and generate relevancy scores based on detected data patterns; and
   arranging the non-fungible tokens in the virtual space as a function of a relevancy score.

20. The method of claim 9, wherein generating the virtual space further comprises:
   selecting a display arrangement of the non-fungible tokens using a template classifier trained on widget characteristics and market data, wherein the market data is derived from a web crawler configured to retrieve content, index the content, and generate relevancy scores based on detected data patterns; and
   arranging the non-fungible tokens in the virtual space as a function of a relevancy score.

* * * * *